US008880382B2

(12) United States Patent
Bagheri et al.

(10) Patent No.: US 8,880,382 B2
(45) Date of Patent: *Nov. 4, 2014

(54) ANALYZING A PATTERNING PROCESS USING A MODEL OF YIELD

(75) Inventors: Saeed Bagheri, Croton on Hudson, NY (US); Fook-Luen Heng, Yorktown Heights, NY (US); Rajiv Vasant Joshi, Yorktown Heights, NY (US); Kafai Lai, Poughkeepsie, NY (US); David Osmond Melville, New York, NY (US); Saibal Mukhopadhyay, Atlanta, GA (US); Alan E Rosenbluth, Yorktown Heights, NY (US); Rama N. Singh, Bethel, CT (US); Kehan Tian, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 229 days.

This patent is subject to a terminal disclaimer.

(21) Appl. No.: 13/352,713

(22) Filed: Jan. 18, 2012

(65) Prior Publication Data

US 2013/0185045 A1 Jul. 18, 2013

(51) Int. Cl.
*G06G 7/48* (2006.01)

(52) U.S. Cl.
USPC ............................................................ 703/6

(58) Field of Classification Search
USPC ............................................................ 703/6
See application file for complete search history.

(56) References Cited

U.S. PATENT DOCUMENTS

| 7,269,817 | B2 | 9/2007 | Heng et al. |
|---|---|---|---|
| 7,448,018 | B2 | 11/2008 | Heng et al. |
| 2005/0177810 | A1 | 8/2005 | Heng et al. |
| 2009/0199151 | A1 | 8/2009 | Banerjee et al. |
| 2010/0122231 | A1 | 5/2010 | Agarwal et al. |
| 2010/0269079 | A1 | 10/2010 | Banerjee et al. |
| 2011/0173577 | A1 | 7/2011 | Chuang et al. |

OTHER PUBLICATIONS

Mukhopadhyay, Saibal, et al., "Modeling of Failure Probability and Statistical Design of SRAM Array for Yield Enhancement in Nanoscaled CMOS", IEEE Transactions on Computer-Aided Design of Integrated Circuits and Systems, vol. 24, No. 12, Dec. 2005, pp. 1859-1880.

Mukhopadhyay, Saibal, et al., "Statistical Design and Optimization of SRAM Cell for Yield Enhancement", IEEE, 2004, pp. 10-13.

Gupta, Puneet et al., "Toward a Systematic-Variation Aware Timing Methodology", Proceedings of the 41st Design Automation Conference (DAC'04), 2004, pp. 321-326.

(Continued)

*Primary Examiner* — Hugh Jones
(74) *Attorney, Agent, or Firm* — Harrington & Smith

(57) ABSTRACT

Techniques are presented that include accessing results of forward simulations of circuit yield, the results including at least circuit yield results including simulated device shapes. Using the circuit yield results, high-level traits of at least the simulated device shapes are determined. Based on the determined high-level traits and using the circuit yield results, a compact model for predicted yield is constructed, the compact model including a plurality of adjustable parameters, and the constructing the compact model for predicted yield including adjusting the adjustable parameters until at least one first predetermined criterion is met. An optimization problem is constructed including at least the compact model for yield, an objective, and a plurality of constraints. Using the optimization problem, the objective is modified subject to the plurality of constraints until at least one second predetermined criterion is met.

18 Claims, 5 Drawing Sheets

(56) References Cited

OTHER PUBLICATIONS

Bansal, Aditya et al., "Yield Estimation of SRAM Circuits using Virtual SRAM Fab", IEEE/ACM International Cofnerence on Computer-Aided Design Digest of Technical Papers, 2009, pp. 631-636.
Heng, Fook-Luen, et al., "Toward Through-Process Layout Quality Metrics", Proceedings of SPIE, vol. 5756, 2005, pp. 161-167.
Singh, Rama, et al., "Layout-Aware Through-Process Circuit Analysis", IEEE 2007, pp. 176-180.
Bansal, Aditya, et al., "Pre-Si Estimation and Compensation of SRAM Layout Deficiencies to Achieve Target Performance and Yield", IEEE 2008, pp. 457-462.

ANALYZING A PATTERNING PROCESS USING A MODEL OF YIELD

BACKGROUND

This invention relates generally to lithographic formation of integrated circuit patterns and, more specifically, relates to techniques for generating lithographic masks and sources under requirements of a predetermined (e.g., maximal) yield in the final device using lithographic optimization (e.g., source optimization, mask optimization, or source-mask optimization) based on a yield model.

Integrated circuits are typically fabricated by using optical lithography to print images of the circuit device structures in photoresist films, followed by a pattern transfer step such as an etch step. However, the required ultrafine dimensions used in modern integrated circuits put a severe strain on the resolution capabilities of available patterning processes, and on the performance of the devices themselves. As a result, it can be very difficult to devise mask features and process conditions (such as the appropriate distribution of light intensities with which to illuminate the mask, such distributions being referred to as sources) that yield functional circuits. Moreover, even after such conditions have been devised, the process of fabricating the devices can be extremely sensitive to the small fluctuations in process conditions that inevitably arise during manufacturing, such as variations in lithographic dose and focus, or in the actual size of the written features of the exposing masks, or in the precise relative positions with which the different levels of the circuit are overlaid against each other as they are patterned.

SUMMARY

Techniques are presented that include accessing results of forward simulations of circuit yield, the results including at least circuit yield results comprising simulated device shapes. The variation ranges are for mask features in one or more lithographic masks used in a lithographic patterning process to create a portion of an integrated circuit comprising electrical devices that are patterned by imaging the mask features to create device shapes. Using the circuit yield results, high-level traits of at least the simulated device shapes are determined. Based on the determined high-level traits and using the circuit yield results, a compact model for predicted yield is constructed, the compact model including a plurality of adjustable parameters, and the constructing the compact model for predicted yield including adjusting the adjustable parameters until at least one first predetermined criterion is met. An optimization problem is constructed including at least the compact model for yield, an objective, and a plurality of constraints. Using the optimization problem, the objective is modified subject to the plurality of constraints until at least one second predetermined criterion is met.

DETAILED DESCRIPTION

Figure 1:
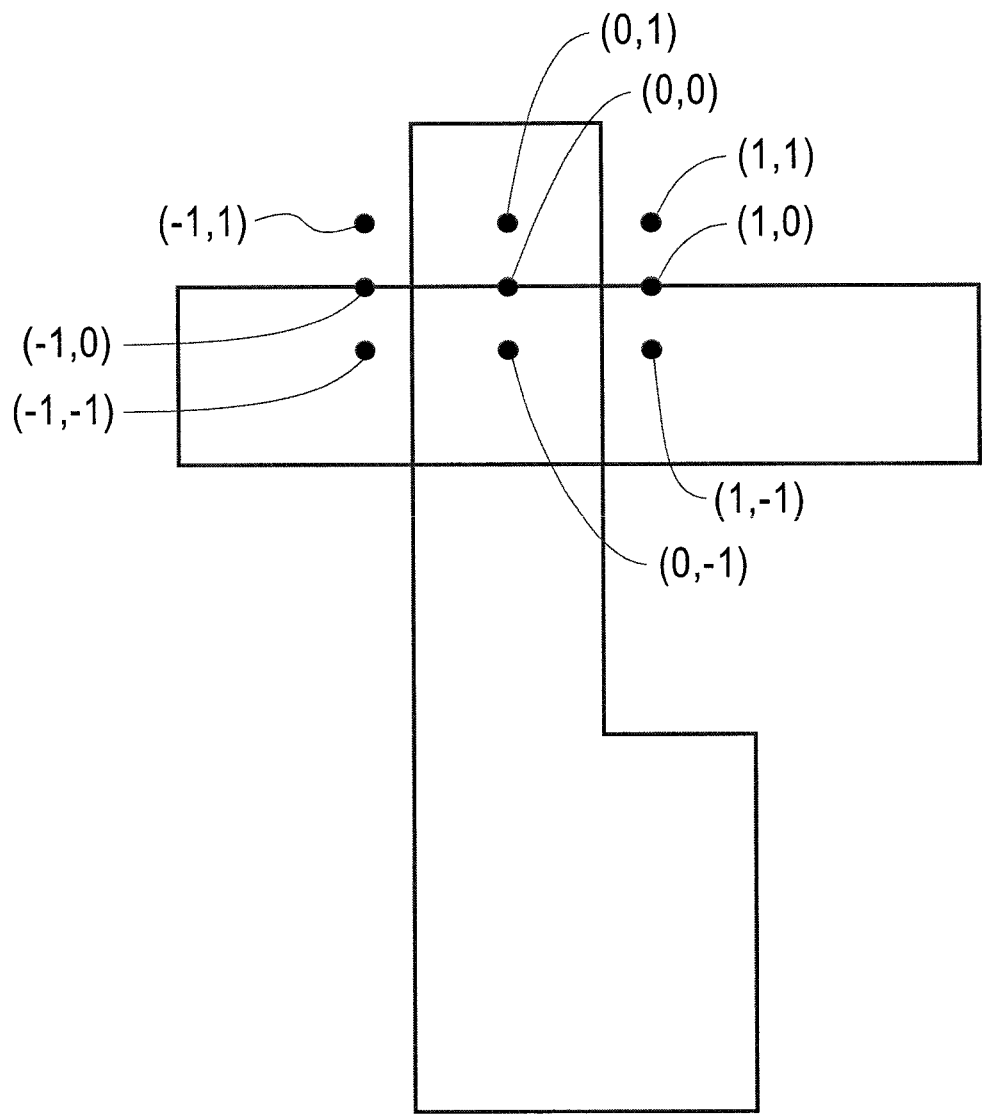
FIG. 1 is a sample point layout for upper PC (poly conductor) edge of a device.

This invention deals with the fabrication of integrated circuits by lithographic patterning, and more particularly with techniques for optimizing the printability of integrated circuits by using a compact yield model based on image traits and device traits, where the devices are formed by projecting features in one or more lithographic masks onto a semiconductor wafer.

Before proceeding with descriptions of exemplary embodiments of the invention, it is helpful to provide an overview.

Overview

As described above, even after process conditions that yield functional circuits have been devised, the process of fabricating the devices can be extremely sensitive to the small fluctuations in process conditions that inevitably arise during manufacturing.

The requirements for proper control of the patterned features are usually specified as allowable ranges of acceptable edge placement; these are known as ground rules. Circuit simulations and measurements are used to generate these ground rules.

Multiple failure mechanisms are considered in functionality studies using such circuit simulations and measurements. In the case of the SRAM (static random access memory) circuit, there are three predominantly known types of failure mechanisms, commonly referred to as the disturb fail, the read fail, and the write fail. Each mechanism may be treated as separately responsible for functionality failure but more generally the functionality failure is a joint failure event arising from a combination of one or more of the fail mechanisms, after taking into account the column/row redundancies that may have been built into the array at design. A value assigned to the fail probability of the failure event is then used as a functionality criterion. Fail probabilities can also cover failure in the pattern transfer process, i.e. failure to properly delineate the desired circuit feature. The probability of such failure mechanisms typically increases when feature separations or thicknesses are inadequate, or when feature areas or extensions become too small. The failure probability associated with a given feature dimension may be determined by experiment or process simulation.

Methods are known for calculating the probability of different types of SRAM failures. It is a common practice to express the probability of cell failure in "sigma" units (not to be confused with the lithographic parameter of the same name). For example, a cell failure probability of "5 sigma" means that the probability lies far into the tails [at the 5*StandardDeviation point] of, for example, a Standard Gaussian (e.g. with mean=0 and standard deviation=1) probability distribution, i.e., the failure probability of a particular cell is a small number. The probability of cell failure determines how likely it is that the entire SRAM array is functional. The yield of the SRAM design is determined by the number of functional SRAM arrays in a lot. Therefore, a large cell failure probability leads to a large number of non-functional SRAM arrays, resulting in yield penalties. In general, any technique for predicting the successful fabrication of a circuit by using "forward simulations" to analyze the processes by which the circuit's device shapes are formed within successive layers of circuit material ("circuit levels"), and/or to analyze the electrical operation of the resulting circuit containing these devices, may be referred to as a "yield model".

The total range over which the process parameters can vary before the patterned features violate one of the ground rules is known as the process window. A common metric for process window is the integral of the width of the valid dose window across all valid focus ranges, where any combination of a dose and focus-range that is allowed to contribute to this integral must represent a dose that yields patterns which obey ground rules at every feature edge when focus is allowed to fluctuate throughout the focus range.

There are known methods for using a patterning model to optimize the patterning process. Often this involves optimizing mask features and process parameters in order to maximize process window metrics of the kind described above. This procedure is sometimes referred to as maximizing printability, a usage followed in this document.

It is common in such methods to emphasize optimization of parameters relating to the lithographic process by which the circuit features are printed in photosensitive films (known as resists); in such lithographic processes a reduced image of features that are deployed in an enlarged mask is projected onto a resist-coated wafer (on which the circuit is built up layer by layer). After each such exposure, the wafer is developed to produce a (typically binary) pattern in the resist film. This resist image is then transferred into a structural element of the circuit using, e.g., an etch process. Etch is often modeled as a bias between the shape of the etched pattern and the shape of the image that is printed in the developed resist. The mask features themselves are often optimized in such a way as to maximize the process window.

The core computational step in these optimization methods involves calculation of the exposing image distribution that would be produced by a trial set of mask features and process parameters (this set being iteratively refined to improve the process window). During such optimizations, a compact resist model may be used, in which the effects of the resist are rendered as, e.g., a shift in the develop-threshold, where the inputs to the compact model are derived from the image intensity distribution. Equivalently, one can regard the threshold as fixed and the intensity as shifting according to the compact resist model. The net result is that the resist model can usually be treated as a modification to the purely optical intensity, and further that this generalized image intensity pattern can be calculated using steps that include, or derive from, the steps used in an optical image calculation. Unless stated otherwise, the term "intensity" may refer in this document to a generalized intensity distribution that includes in this way the effect of resist nonidealities after thresholding for calculation of printed contours.

The mathematical methods used to optimize the patterning process (as simulated by compact process models such as the above-described compact resist models) can be quite complex and numerically intensive. Typically the optimization problem for even a small circuit like an SRAM cell might involve of order 100 variables in each level (e.g., 100 or more mask and source degrees of freedom). Intensive optimization of the process window for each level of such a cell might involve of order 100,000 calculations of the intensities at each of 200 or more sample points within the cell. Fortunately, methods are known for very rapidly calculating the generalized intensity.

Unfortunately, while the known methods for lithographic optimization can provide very sophisticated and exhaustive adjustments of the process parameters and mask features, the process window that they optimize is defined by a set of ground rules which are suitable for layout by human designers, not for intensive mask optimization. For example, the circuit simulations that are carried out to develop ground rules will generally make use of the Manhattan device shapes deployed by circuit designers, even though the features that are actually printed when fabricating state-of-the-art circuits will strain the patterning process to the point that their shapes will inevitably be rendered on the wafer with substantial rounding and edge curvature.

Also, the general goal of design rule methodology is to provide the designer with relatively simple rules that, if followed for every deployed shape, will ensure circuit functionality. Such universally applied rules must often be kept quite tight in order to be applicable to every feature, and as a result many detailed aspects of the electrical behavior of the individual features is neglected, both at the device and circuit levels.

It should also be noted that only a limited number of true degrees of freedom are available to the lithographic optimizer as it attempts to maintain ground rules in the face of process fluctuations. For example, even though mask features can in principle be "decorated" with a very high density of jogs and serifs, the number of truly independent degrees of freedom on the mask is limited by the effective Nyquist density which equals $(2*NA*(1+\sigma)/\lambda)^2$, where $\lambda$ denotes wavelength, NA is the numerical aperture of the lithographic projection lens, and $\sigma$ denotes the maximum normalized extent of the lithographic source.

The process of adjusting the lithographic process (typically the decorated mask features) to enforce ground rules is known as Optical Proximity Correction (OPC). Optimization methods are known for maximizing the lithographic process window (i.e., the range of allowable fluctuations in parameters like dose and focus) within which the printed features maintain ground rules. Typically this optimization is carried out by dividing the edges of mask features, and the contours of printed images, into so-called fragments. In an advanced conventional OPC method, an optimizer would then attempt to adjust the positions of the mask fragments in such a way as to maximize the process window within which the image edges continued to obey the ground rules. Typically each image fragment has a target position near the center of its allowable range; the as-fabricated excursion of a particular fragment in the printed edge from its nominal position is known as Edge Placement Error (EPE). Though both the mask and wafer patterns may contain a large density of fragments, the above-noted inherent limit on the density of true degrees of freedom in the mask and image means that the optimizer will very often not be able to reduce the EPE errors to zero even in the center of the process window. The challenge becomes even larger when the optimizer also attempts to reduce the sensitivity of edge placement to fluctuations in process parameters like dose and focus.

An additional drawback to the prior art is that the severe resolution challenges faced by current lithographic processes prevent the ground rules from achieving anything close to the simplicity that is traditionally sought.

Ground rules must be formulated with sufficient stringency to assure yield, and in particular this stringency must compensate the simplifications that result from formulating the ground rules in terms of the idealized edges of the drawn shapes used by circuit designers. In reality, device behavior derives from the complex perimeter of the patterned shape, and is inherently a multilevel quantity.

Ground rules must also insure yield even though they reflect, in an averaged way, the complex dependence of circuit performance on the collective behavior of the entire specific configuration of interacting devices that is present in each particular fabricated circuit, not just on the average pattern quality achieved in individual devices or in individual device edge placement.

Recently methods have been developed to assess circuit functionality from simulations of the printed device shapes; this is referred to herein as "forward" simulation. The speed of forward circuit simulation has greatly improved as a result of these methods, though it remains slower than purely optical simulations; circuit simulations involving of order 500 process configurations are now feasible for cells of SRAM scale. These methods have shown that the functionality of common circuits like SRAM depends on certain key (e.g., high-level) device traits, such as the effective length L and width D. In a typical SRAM of the six transistor type there are three independent values of L and D that govern cell performance (and by extension array performance).

However, the substantial volume of simulation that must be carried out in employing advanced optimization methods ("back simulations") currently forces such methods to rely on standard edge-position ground rules, and these ground rules constitute an excessively simplified description of yield requirements.

Description of Exemplary Embodiments

An exemplary aspect of the instant invention is to stage compact process models with a compact model of circuit yield that is based on high-level image and device traits. By using such a staged model in a solvable optimization problem as described below (in an exemplary embodiment), one can maximize the printability of features that succeed in providing functional circuits. More specifically, mask and process parameters may be optimized to maximize lithographic process window while holding the probability of failure in the manufactured circuit to an acceptably small level.

It is noted that the invention does not require that a compact process model be used. Often lithographic optimization is carried out without including process effects (which means implicitly treating the process as ideal, and calculating printed contours by thresholding the intensity), and the present invention can be carried out in that mode.

Returning to optimization, in an exemplary embodiment, first a potentially acceptable range is defined of variations in the process conditions and in the allowable edge locations of significant mask features (corresponding, for example, to varying overall bias levels in mask features that have been optimized according to conventional ground rules). See items (1) and (2) of block 210 of FIG. 2. As an alternative or supplement to such variations in the input parameters (mask content and process parameters), one may also define a potentially acceptable range of variation in high-level device traits like L (length) and W (width).

Next, forward simulations of circuit yield are carried out on a representative set of mask and process parameter configurations that are drawn from the above ranges. Typically, a fairly large number of such simulations would be carried out, such as about 500. See item (3) of block 210.

Next, the results of these simulations are used to construct a compact model of circuit yield based on high-leverage characteristics (i.e., high-level traits) of the forward-simulated device shapes and exposing images. See block 220 of FIG. 2. The symbol Y is used to denote the circuit yield predicted by this model. Standard data-mining techniques (such as principal component analysis) may be used to identify these high-level traits. Alternatively, these traits can be established on physical grounds; for example the effective width W and length L of the devices in the circuit constitute such traits. Since the circuit under consideration will typically contain many devices, L and W can be regarded as multi-element vectors, whose components form a list of the effective lengths and widths of the different devices in the circuit. The high-level traits can be any features of the forward-simulated device shapes and exposing images.

In block 230, a compact model is constructed. The compact model can take the form of a standard linear or nonlinear regression model which uses image traits and device traits as independent variables (or uses functions of these traits as variables). Standard statistical methods can be used to construct and verify these regression fits. Alternatively, the compact model can be constructed using methods from machine learning; the model might take the form of a support vector machine, for example. As yet another alternative, the compact model can take a binary or tophat form, in which the yield is taken to be approximately 1 (one) if a list of tolerances or groundrule requirements is met, and 0 (zero) otherwise. Another example based on Taylor series models is described below. It should be noted that exemplary embodiments use forward simulation to obtain the circuit yield dataset from which the compact model is derived, i.e., this dataset need not be obtained experimentally. However, the dataset may be supplemented with experimentally determined data.

In some cases, it can be preferable to compute the device and image traits in a slightly different way when they are used as model inputs than when these same quantities are calculated during the initial forward simulations. As will be discussed further below, it is desirable to use input traits that can be calculated quickly. However, the physical quantities that serve as traits may ordinarily require a relatively intensive and costly level of simulation to calculate accurately. In order to obtain an accurate prediction of circuit yield, such intensive calculations may be appropriate during the forward simulations. However, these circuit yield results can be regressed upon traits that are obtained by making more approximate calculations of the same physical quantities. In this way, the regression model can be used to correct much of the prediction error that results from using fast approximations to calculate the traits, and as a result the model inputs can be calculated using fast (but approximate) methods that are compatible with intensive optimization.

The width W of a device is calculated (for use as a model input trait) by determining either the minimum or average width of the recessed-oxide (RX) level contours of the device as it is formed by the poly gate, with contour sections on each side of the finite-length device being used to bracket the width. The length L of the device can similarly be calculated as the harmonic mean of the lengths of elementary slices along the device width. Alternatively, an electrically equivalent length and width may be calculated following the algorithm proposed by Heng et al., "Toward Through-Process Layout Quality Metrics", in Proceedings of the SPIE (Society of Photographic Instrumentation Engineers) vol. 5756, pp 161-167 (2005).

To rapidly calculate these device contours, standard methods may be used to calculate the generalized image intensity at a grid of points spanning the edge, such as at the nine points shown in FIG. 1. Contours can then be calculated within this grid. For example, they may be calculated within a limited range ("trust region") by linearizing the intensity or generalized intensity, as described in Heng et al., "Lithographic Process Window Optimization Under Complex Constraints on Edge Placement", U.S. Pat. No. 7,269,817. Alternatively, a quadratic model may be used, as follows. An x,y Cartesian index is used to distinguish the intensity of these different points, i.e. their intensity is denoted $I[-1,-1]$, $I[-1,1]$, $I[0,-1]$, $I[0,1]$, $I[1,-1]$, $I[1,0]$, $I[1,1]$. If x then designates the coordinate along the edge, and y the perpendicular coordinate, the equation of the contour predicted by a process model using a reference threshold t is (under a quadratic model) approximately given by (Equation 1):

$$y = \frac{-2g_{(0,1)} - 2xg_{(1,1)} + \sqrt{(-2g_{(0,1)} - 2xg_{(1,1)})^2 + 4g_{(0,2)}(2t - 2g_{(0,0)} - 2xg_{(1,0)} - x^2 g_{(2,0)})}}{2g_{(0,2)}}$$

where the g coefficients in Equation 1 are obtained from the calculated grid of image intensities as (Equation 2):

$$g_1((0,0)) = 1/9(I[-1,-1] - 2I[-1,0] + I[-1,1] - 2I[0,-1] -$$
$$5I[0,0] - 2I[0,1] + I[1,-1] - 2I[1,0] + I[1,1])$$

$$g_{(0,1)} = \frac{1}{6}(I[-1,-1] - I[-1,1] + I[0,-1] - I[0,1] + I[1,-1] - I[1,1])$$

$$g_1((0,2)) = 1/3(-I[-1,-1] + 2I[-1,0] - I[-1,1] -$$
$$I[0,-1] + 2I[0,0] - I[0,1] - I[1,-1] + 2I[1,0] - I[1,1])$$

$$g_{(1,0)} = \frac{1}{6}(I[-1,-1] + I[-1,0] + I[-1,1] - I[1,-1] - I[1,0] - I[1,1])$$

$$g_{(1,1)} = \frac{1}{4}(-I[-1-1] + I[-1,1] + I[1,-1] - I[1,1])$$

$$g_1((2,0)) =$$
$$1/3(-I[-1,-1] - I[-1,0] - I[-1,1] + 2I[0,-1] + 2I[0,0] +$$
$$2I[0,1] - I[1,-1] - I[1,0] + I[1,1])$$

The Equation 1 contour may be offset according to a specified or calculated etch bias. The Equation 1 contour is merely exemplary; any known contouring method can be employed.

In an exemplary embodiment, the above calculations would be repeatedly carried out for one or more sets of perturbed masks; for example masks whose perturbation is denoted $\Delta M_+$ and $\Delta M_-$ referring to masks that are biased to the extremes of specified mask dimensional tolerances. M denotes the (unbiased) set of mask features that are being optimized. These mask features may optionally be used on more than one mask to print more than one level of the circuit, and, in the case of so-called multiple exposure processes, they may include features on multiple masks that are employed to print one of the circuit levels using more than one exposure. S denotes the lithographic source in embodiments where the source is optimized, and may include multiple sources for multiple exposures, and/or multiple sources for the exposure of multiple circuit levels. In general, the S variables can represent any set of parameters which determine the shape of the source. As of now, the most suitable choice would apply to recently introduced programmable illumination systems, where to expose chips, the user inputs a list of the illuminating intensities that should be provided by each pixel in a gridded source map. This map is basically a grid of directions (to be more precise a grid of direction cosines), and each pixel value gives the relative intensity that the illuminating light from the associated direction should provide. These pixels are on a 2D (two dimensional) grid, and S is an unwrapped 1D (one dimensional) list of their intensity values.

The symbol O is used to denote an alignment error between a level and a reference level; separate overlay errors are present for each level, and along each coordinate. Formally, overlay error causes a relative shift in the exposing intensity distribution, and its impact is expressed in that form. However in practice, the impact of overlay error is calculated by shifting a contour expression such as Equation 1. The subscripts + and − are used to designate image shifts at the limits of specified overlay tolerances.

After following the above operations, one is in a position to use known compact process models to efficiently calculate the traits needed as inputs to the compact circuit yield model. Then, by staging the circuit yield and process models, e.g., applying the fast compact yield model to the traits calculated with the process models, one is able to rapidly predict circuit yield using equations of the form (Equation 3):

$$\vec{I} = \vec{I}(\vec{M},\vec{S};k\Delta z;D,O_x,O_y,\Delta M),$$

$$\vec{I}(D)_{k,\pm,\pm,\pm} = \vec{I}(\vec{M},\vec{S};k\Delta z;D,O_{x,\pm},O_{y,\pm},\Delta M_{\pm}),$$

$$\vec{L} = \vec{L}(\vec{I}), \vec{W} = \vec{W}(\vec{I}),$$

$$Y = Y[\vec{L},\vec{W},\vec{I}].$$

Here D designates dose. The third line ($\vec{L}=\vec{L}(\vec{I})$, $\vec{W}=\vec{W}(\vec{I})$) of Equation 3 shows the high level traits being calculated from the patterning model, and the fourth line (Y=Y[$\vec{L}$, $\vec{W}$, $\vec{I}$]) shows the circuit yield being calculated from the high level traits. For the term $k\Delta z$, k specifies a particular focal plane and $\Delta z$ specifies that the focal planes are equally spaced. A non-equispaced selection of sampling planes through focus can also be employed. The terms $\vec{I}$, $\vec{L}$, and $\vec{W}$ are lists of values for intensity, length, and width, respectively, at different positions. Typically a given percentage dose change can be considered to approximately scale the intensity up or down by that given percentage, but Equation 3 uses a less explicit notation to allow for more general resist models.

One can now formulate (block 240 of FIG. 2) the problem of maximizing a so-called "rectangular" process window (with focal depth $K_{max}$) as an optimization problem of standard form (Equation 4A):

$$\underset{w.r.t. \ \vec{M},\vec{S};K_{Max};D_-,D_+}{\text{Maximize}} \ [D_+ - D_-]K_{Max},$$

Subject to:

$$Y[L(\vec{I}(D_+)_{k,\pm,\pm,\pm}), W(\vec{I}(D_+)_{k,\pm,\pm,\pm}), \vec{I}(D_+)_{k,\pm,\pm,\pm}] \geq Y_0,$$

$$\left( \forall k \ \middle| \ \begin{array}{l} 1 \leq k \leq K_{Max}; \\ \text{All} \pm \text{combinations} \end{array} \right)$$

$$Y[L(\vec{I}(D_-)_{k,\pm,\pm,\pm}), W(\vec{I}(D_-)_{k,\pm,\pm,\pm}), \vec{I}(D_-)_{k,\pm,\pm,\pm}] \geq Y_0,$$

$$\left( \forall k \ \middle| \ \begin{array}{l} 1 \leq k \leq K_{Max}; \\ \text{All} \pm \text{combinations} \end{array} \right)$$

$$E(\vec{I}(D_\pm)_{k,\pm,\pm,\pm}) \ \text{satisfies all relaxed ground-rules.}$$

$$\left( \forall k \ \middle| \ \begin{array}{l} 1 \leq k \leq K_{Max}; \\ \text{All} \pm \text{combinations} \end{array} \right)$$

Equation 4A assumes for simplicity that only a single mask level is being optimized; however it will be clear to those skilled in the art that the method is general, so that, for example, the ± combinations can cover all mask bias extremes among multiple masks along with combinations of other process limits that are known to produce particularly unfavorable printing conditions. These extreme conditions can include cases where more than one circuit level is involved. $Y_0$ denotes the required circuit yield. Additionally, a set of grid points (see, e.g., FIG. 1) for Equations 1 and 2 would be set up in block 240.

The last line of Equation 4A (including E(.)) indicates that the printed shapes should obey a set of relaxed ground rules that are calculated in essentially the same way as standard ground rules. These relaxed ground rules help insure that the solution being optimized does not drift out of the range of validity of the compact circuit yield model. These ground rules would generally be less restrictive than standard ground rules, and also less complex. They can be supplemented by constraints on the allowed range of L and W. These constraints may encompass the so-called generalized or flexible constraints described in Heng et al., U.S. Pat. No. 7,269,817, which, according to Equation 3 of that reference, take the form $$x_{j_+} - x_{j_-} < D_j,$$

where x can denote either the vertical or horizontal coordinate. Alternatively, some of these constraints may take on a Boolean form that involves both the horizontal and vertical coordinates, for example $$\text{IF } [(y_{j_+} - y_{j_-} > D'_j) \text{ THEN } (x_{j_+} - x_{j_-} < D''_j)].$$

Figure 4A:
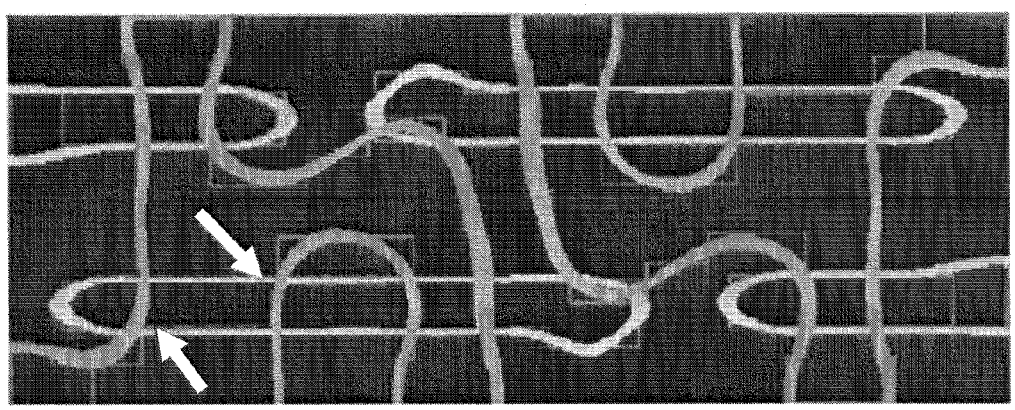
FIGS. 4A and 4B show varying print contours for the RX level of an SRAM (static random access memory) cell.

In the example of FIG. 4A, the range of acceptable variation in dose D is being optimized along with the extreme range of acceptable focus variation ($K_{Max}\Delta z$. More specifically, it is the product of the extreme acceptable focus variation ($K_{Max}\Delta z$) with the range of acceptable dose from smallest (D−) to largest (D+) that is being maximized, e.g., the dose window is being maximized as the objective of the optimization. This objective is being maximized, subject to constraints of maintaining acceptable electrical/circuit yield Y while maintaining adequate printability and also satisfying ground rules constraints. (Note that the spacing $\Delta z$ between sampling focal planes is a constant factor that can be omitted from the objective, as has been done in Equation 4A.) Another embodiment could involve (block 240 of FIG. 2) using a yield model as the objective, i.e., maximizing yield. In principle, the exact form chosen for the circuit yield model could be modified depending on which embodiment is being used, but for purposes of discussion, one can assume that the same function Y is always used, either as objective, or as a constrained quantity.

Another aspect of this additional embodiment is that when the process window (given by the dose window in Equation 4A) is no longer the quantity being maximized, one would usually want to add constraints on lithographic quality to the formulation. In the simplest case, this would just be done implicitly, by treating the dose latitude limits D_ and D_+ as fixed values that must be maintained, and likewise for the focus limit $K_{Max}$; i.e., these quantities would no longer be optimization variables but would be fixed at adequately large values. Then, to maximize the worst-case circuit yield arising over all dose and focus conditions, one would need to make the achieved circuit yield $Y_0$ a variable. Thus, in the most straightforward reformulation of Equation 4A to implement the second embodiment, the optimization problem would become (Equation 4B):

Maximize $Y_0$,
w.r.t. $\vec{M}, \vec{S}; Y_0$

Subject to:

-continued $$Y[L(\vec{I}(D_+)_{k,\pm,\pm,\pm}), W(\vec{I}(D_+)_{k,\pm,\pm,\pm}), \vec{I}(D_+)_{k,\pm,\pm,\pm}] \geq Y_0,$$

$$\left(\forall k \;\middle|\; \begin{array}{l} 1 \leq k \leq K_{Max}; \\ \text{All} \pm \text{combinations} \end{array}\right)$$

$$Y[L(\vec{I}(D_-)_{k,\pm,\pm,\pm}), W(\vec{I}(D_-)_{k,\pm,\pm,\pm}), \vec{I}(D_-)_{k,\pm,\pm,\pm}] \geq Y_0,$$

$$\left(\forall k \;\middle|\; \begin{array}{l} 1 \leq k \leq K_{Max}; \\ \text{All} \pm \text{combinations} \end{array}\right)$$

$E(\vec{I}(D_\pm)_{k,\pm,\pm,\pm})$ satisfies all relaxed ground-rules.

$$\left(\forall k \;\middle|\; \begin{array}{l} 1 \leq k \leq K_{Max}; \\ \text{All} \pm \text{combinations} \end{array}\right)$$

Equations 4A and 4B can be solved (block 250 of FIG. 2) using standard methods of nonlinear optimization. In the examples shown above, the quantity being optimized as objective is maximized (one possible criterion), but the optimized quantities could be minimized (another possible criterion) or just modified to the extent the quantity is improved according to another criterion.

Referring to block 240 again, in many cases, the compact model would be defined to have a certain functional form which includes numerical parameters whose values are initially undetermined. Then to finalize the model, a fitting process would be undertaken, in which the values of these numerical parameters would be set in such a way as to minimize the difference (e.g., the RMS, root mean square, difference, or simply the mean squared difference) between the compact model predictions and the results of the forward simulations.

The procedure just described corresponds quite closely to what the term "fitting" normally conveys. However, if Y were to be given the functional form of a truncated Taylor series, the coefficients might be calculated (block 230) by finite-differencing the forward simulations. As is known, the idea behind finite-differencing is that when Y is taken to be a sum of terms from a Taylor series in all the variables (truncating the series at some sufficient number of terms), the unknown coefficient of each term is proportional by construction to a particular derivative of some order with respect to some particular subset of the variables. By definition, each such derivative represents a ratio of the infinitesimal change in Y with respect to corresponding infinitesimal changes in the subset of variables (nested appropriately for higher-order derivatives). Finite-differencing approximates these infinitesimal changes by making very small but finite changes in the independent variables, and calculating the resulting change in Y. It is noted that the predicted yield from forward simulations gets used in finite differencing when a Taylor series model is being derived in this way. More specifically, the only unknown parameters in a Taylor series model are the various derivatives of yield (including mixed and high order derivatives). The derivative of a quantity with respect to a variable is simply the ratio of the infinitesimal change produced in the quantity divided by the infinitesimal change in the variable causing the change. Numerically, one can calculate this derivative in an approximate way by making a small but finite change in the variable, and determining how much the quantity being differentiated changes (specifically, by subtracting the initial value of the quantity of interest from its value after the variable is changed). This is finite differencing, and each finite difference involves calculating the quantity of interest twice—In the instant example, this would mean two forward simulations of predicted yield. And since mixed and higher-order derivatives are simply nestings of first derivatives, the same approach can be used to approximately calculate as many terms in the Taylor series as are desired. When Y has the functional form of a Taylor series, it is not automatically the case that finite-differencing must be used to determine the coefficients. As an alternative option, the coefficients might instead be determined by a process of fitting in the ordinary narrow sense of the word. Thus, in block 240, the construction of the compact model does not necessarily include fitting operations.

Dual alternatives as shown by Equations 4A and 4B are a common aspect of lithographic optimization, i.e., one usually has the option of using, e.g., metric A as an objective and metric B as a constraint, or of making B the objective while constraining A. Also, it is often desirable to use a "zigzag" approach in which two or more stages of optimization are carried out, alternating the roles of the two metrics from one stage to the next. This is illustrated by block 260, where a constraint can become an objective and an objective can become a constraint, and block 240 performed again. Block 260 typically would involve a change in Equation 4 (4A or 4B), i.e. changing the role of $Y_0$ from objective to constrained quantity, for example switching back and forth between Equations 4A and 4B. However, there is no reason why the functions used (i.e., Equation 3) could not be changed as well. And the Equation 3 quantities would typically be recalculated at each iteration that is undertaken in the process of solving Equation 4 (4A or 4B); this is a normal part of standard procedures for solving optimization problems.

In some embodiments the loop back from 260 would actually proceed to a preliminary step (235) before block 240, in which a new set of grid points for Equations 1 and 2 would be set up, with the optimization program of step 240 then being constructed in terms of these new points.

Another point to consider is that some embodiments include an outer loop which is different from 260 (and which would usually be nested outside 260). More specifically, when block 250 is exited after the termination criteria are met, one may optionally employ a step (245) in which the nominal Equation 1 contour results are snapped to approximating rectangular shapes, with the flow then jumping back to block 230, where forward simulations centered on the new shapes are used to construct a new compact yield model. This optional outer loop can be exited in response to the differences between the new set of rectangular shapes and the previous set have become smaller than a pre-established criterion. This criterion can be chosen to ensure that the difference between new and old shapes falls within the range of shape variations that a single compact yield model can be expected to encompass.

In block 270, results are output. One possible result is a mask itself Additionally or instead of the mask, the process parameters (or even a complete description of the process) can be output in block 270. Further, mask features suitable to make a mask may be output. Regarding process parameters, an important one of these would be the source parameters S. One option is to use the source parameters S from block 270 to configure the illumination which exposes the wafer. Alternatively, if a conventional method like SMO (source-mask optimization) is to be used to design the source that is actually employed in exposing the wafer, the source parameters S from block 270 can be used to initialize the SMO source, and if the SMO method includes optimization of the mask then the SMO mask features can be initialized with the mask features output from block 270. The optimum dose and the focus set point might also be determined. It is also possible for some aspects of the mask solution to be defined by rules rather than explicit shapes, and the adjustable parameters in these rules could be considered process parameters. The equations currently list the dose D (as well as the source S), but do not include the other parameters. All of these are options; usually some (like dose or the focus set point) would not be included as variables, i.e., they would be fixed to a standard value. In principle, any subset of these factors could be chosen as the adjusted variables in the equations and output.

Another option is to output the contour edge defined in Equation 1, with an additional optional refinement step being to snap these output edges to positions that form straight horizontal or vertical edges, with right-angled corners. Output of this kind constitutes an improved set of design shapes for the circuit/device features. These improved target shapes can be analyzed using new electrical forward simulations, in order to check for any inaccuracies in the compact yield model. If necessary, a new compact yield model can be constructed, and new masks and/or sources designed by repeating the optimization flow. In addition, after the final set of target shapes has been output, changes that match these improved target shapes can be made to the target device shapes present in other areas of the circuit layout. This may represent an attractive alternative to carrying out computationally intensive yield-model optimization on all areas of the layout. Also, if a conventional method like SMO or OPC is used to design a portion of the mask layout, the mask features and assisting mask structure for any devices in that portion of the layout which are of the same kind as the devices whose target shapes have been optimized may be initialized with the corresponding optimized mask shapes and optimized assisting structure before commencing SMO or OPC (which may be carried out using the newly optimized target shapes as targets).

Figure 2:
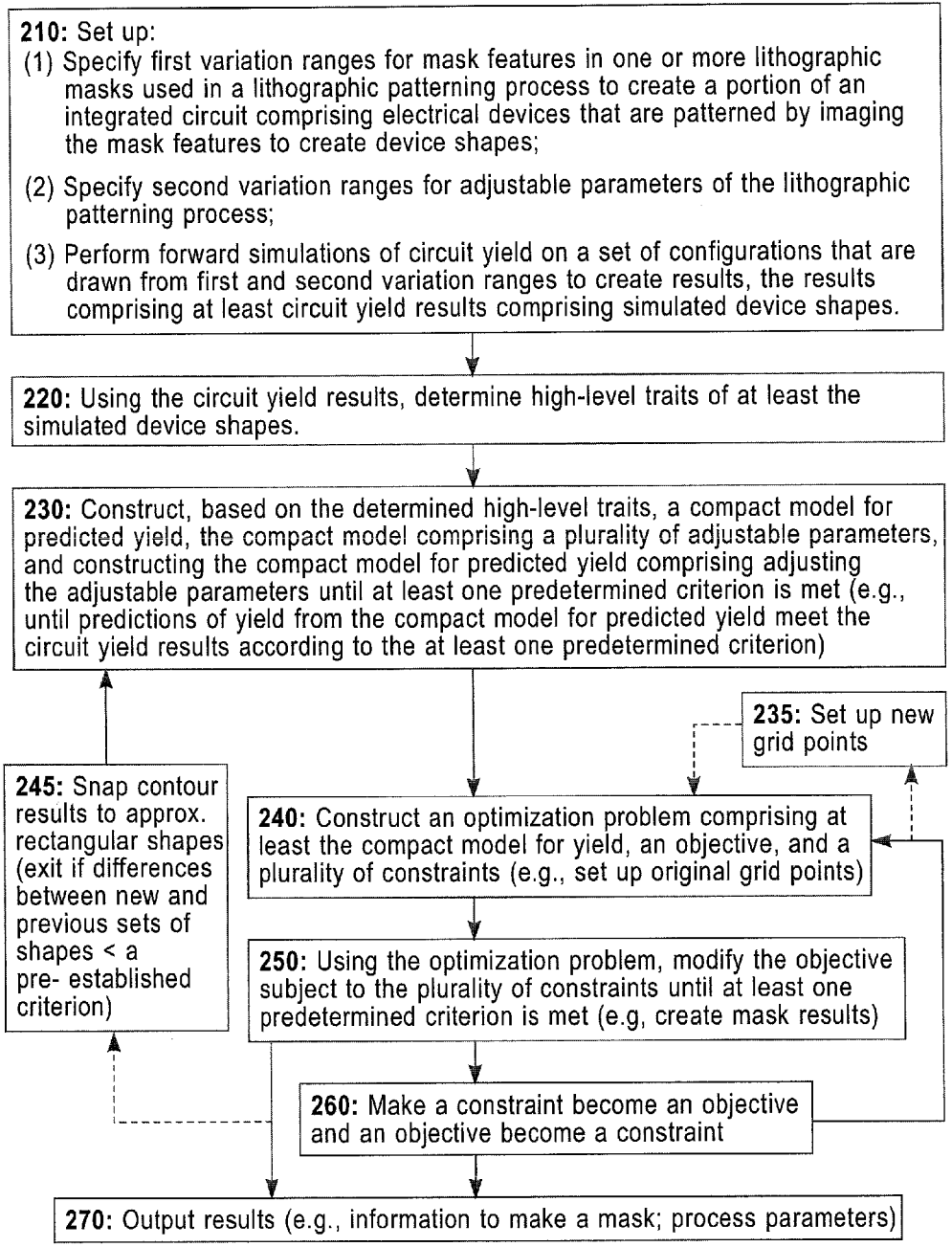
FIG. 2 is a method for analyzing a patterning process using a model of functionality yield.

As far as the steps in FIG. 2 are concerned, there are no steps that could not reasonably be carried out by computer, at least in some circumstances, though some steps normally would not be. Specifically, steps 210(1) and 210(2) would normally be carried out by a human, making use of engineering judgment. However, it would be possible to automate steps 210(1) and (2). Step 210(3) would typically always be carried out by computer.

Step 220 would be carried out by a computer in some embodiments, e.g., if a computer identifies the high level traits by data mining. In other embodiments, step 220 would be carried out by a human, e.g., if the high-level traits are selected on the basis of obvious physical relevance, as when the effective L and W of the devices are chosen. The compact model could also use a mix of human-selected and machine-selected traits. The rest of the steps in FIG. 2 would typically be carried out by a computer.

It is noted that the process parameters described in reference to the above equations are merely exemplary, and other parameters may be used. For instance, recently new lithographic exposure tools have been announced that will allow the user to adjust a new kind of process parameter, namely phase components in the lens pupil. Previously, all pupil phases were simply adjusted to be as close to zero as possible, but in future tools, it will be possible to adjust pupil phases in order to counterbalance other sources of phase arising in the system, particularly phase shifts from mask topography or lens thermal load.

The process parameters which are determined by the invention can include these phase parameters. Qualitatively, this does not particularly change the workings of the invention. Basically, the phase parameters, like the source parameters, come into the problem by altering the image intensity I. While S is referred to herein as a list of source parameters, one can also append to S a list of other adjustable process parameters such as pupil phase. Typically, the pupil phase parameters are the numerical coefficients of a polynomial which describes the phase profile across the lens pupil, with this polynomial commonly having the form of a Zernike expansion.

Figure 3:
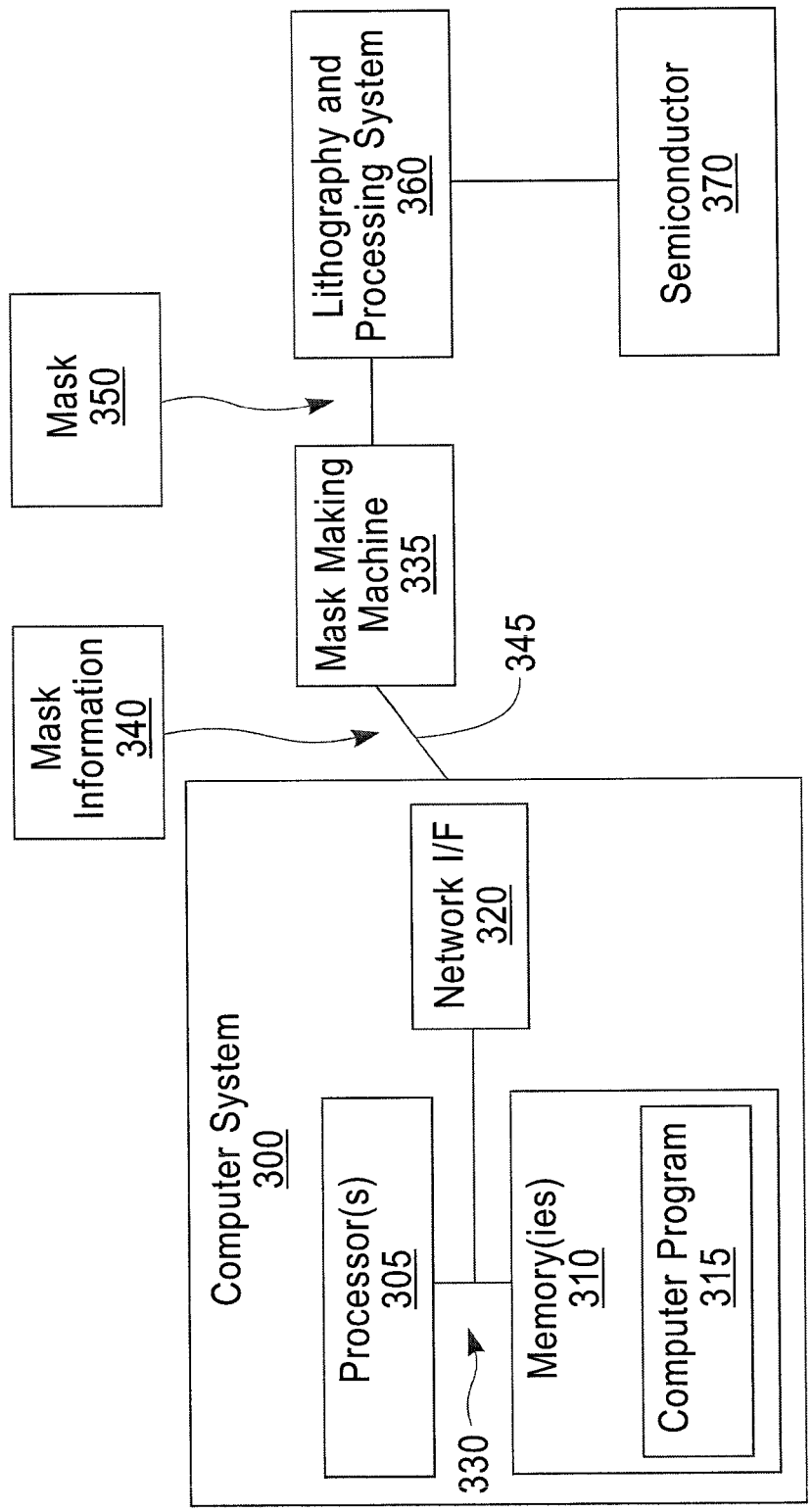
FIG. 3 is a system for analyzing a patterning process using a model of circuit yield.

FIG. 3 shows an exemplary system for analyzing a patterning process using a model of circuit yield. The system includes a computer system 300 having one or more processors 305, one or more memories 310, and one or more network interfaces 320, interconnected using one or more buses 330. The one or more memories 310 include a computer program 315 defined to cause the computer system to perform one or more of the operations described herein. In one embodiment, mask information 340 is output to the mask making machine 335 via link 345. The mask making machine 335 makes a mask 350 from the mask information 340. The mask 350 is used by the lithography and processing system 360 to create device shapes on the semiconductor 370.

EXAMPLES

Roughly speaking, a design obtained by conventionally formulated lithographic optimization (e.g., mask optimization, or source-mask optimization), or by some forms of process-window Optical Proximity Correction (OPC), can be regarded as the solution to an optimization problem that can usefully be defined using the same notation as Equation 4A. Specifically, the conventional process-window OPC or conventional lithographically optimized design will be the solution to an optimization problem in which the ground rule constraints in Equation 4A constraints (analogous to the last line in Equation 4A) are given their standard, non-relaxed form, and in which the first two constraint groups in Equation 4A constraints are automatically satisfied (because the ground rules are not relaxed), and so are redundant. From this relationship, one can conclude that a design provided by conventional process-window OPC or conventional lithographic optimization will typically be feasible under the constraints of Equation 4A, as long as the new yield model and the conventional ground rules are properly constructed, since the conventional ground rules are designed to ensure the same functionality that the yield model is designed to predict.

This in turn implies that the methodology of the instant invention is capable at a minimum of providing all the performance benefits that accrue from conventional process window OPC or conventional lithographic optimization, since the optimal feasible solution to Equation 4A will by definition provide at least as large a process window as the feasible solution that conventional process-window OPC or conventional lithographic optimization produces.

Moreover, Equation 4A can in fact be expected to provide appreciably superior process windows to conventional process window OPC or conventional lithographic optimization. Discussion is now presented, using artificial examples, on two specific routes to improved printability that the new methodology opens up. An explanation will then describe the superiority of an exemplary method in more general terms.

FIG. 4A shows the varying print contours for the RX level of an SRAM cell, under the assumption that the patterning process is operated at the extreme tolerance limits of lithographic parameters like dose, focus, mask error, and overlay. Though the plot only displays the contour variations as a solid band (the so-called PV band) (and displays mask features via thin lines corresponding to the solid bands), it can be seen that the curvature induced by process variations is asymmetric for the pull-down gate. Specifically, the left end of the left-side pull-down gate (indicated by a first arrow in the lower left corner) exhibits a more pronounced curvature sensitivity under RX process variations than does the right end (indicated by a second arrow to the right of the first area). By symmetry, the right-side pull-down gate prints in an identical manner to the left-side pull-down gate, except for a 180 degree rotation. If the effective gate width is determined by the average horizontal contour separation across the length of the transistor, it is then clear even from the undifferentiated PV bands that process variations will cause a variation in the effective gate width that amounts to several percent.

Figure 4B:
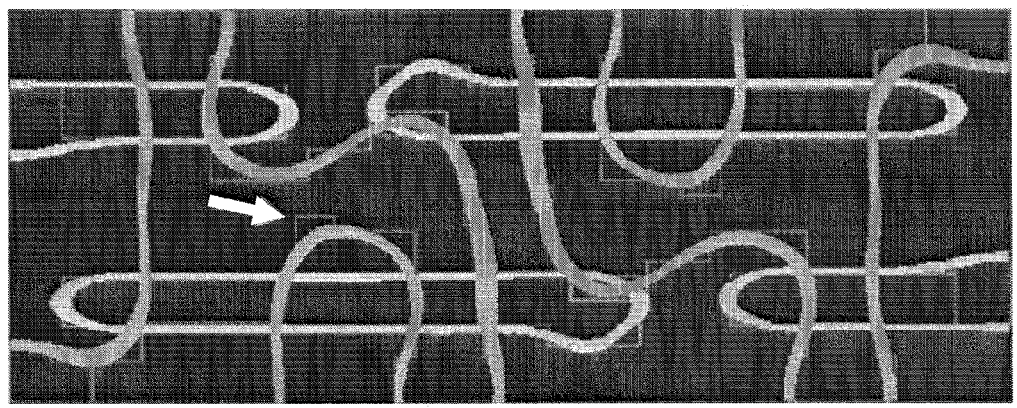

FIG. 4B illustrates the hypothetical effect of an adjustment to the RX mask feature (indicated by the arrow) which increases the variation in the printed horizontal position of the right end of the device, but that does so in such a way as to produce a roughly equal and opposite variation to that induced in the left end. As a result of this counterbalancing, the change in the effective width of the device through process is significantly reduced (since the counterbalanced curvatures result in horizontal cross-sections across the length of the device that are roughly uniform in length), even though the curvature of the adjusted device edge is increased. In other words, the mask adjustment has improved device yield even though it has increased Edge Placement Error (EPE).

It should be emphasized that FIG. 4B presents a purely illustrative correction, i.e., this figure does not show the result of a true lithographic simulation. Nonetheless, the illustrated advantage is correct in its broad terms: In many cases the effective device width is a more direct driver of array yield than is the excursion from nominal of any particular OPC fragment located along any particular feature edge. Conventional EPE-based litho optimization attempts to minimize the process sensitivity of each such fragment location, along each device edge. The device in the figure might contain four such fragments along the device width (i.e., two across each end), and it can be difficult for the optimizer to strongly reduce the sensitivity of all such fragments, since strong optical proximity effects only extend across a relatively short range (limiting the number of adjustable degrees of freedom in the optical neighborhood of the device, as discussed above).

However, this is no longer the case when exemplary embodiments of the instant invention are employed. The instant invention allows the effective device width (in an exemplary embodiment) to be directly accessed as a single parameter, and by including the effective device width as a variable in the compact yield model this exemplary embodiment of the instant invention also allows the effective device width to be optimally adjusted. An exemplary new method in effect allows the optimizer to maximize yield by marshalling the limited available set of independent degrees of freedom to directly control high-leverage device or image traits like effective device width, rather than attempting to control a much larger number of image contour fragments in an effort to maintain effective device width by preserving the single device shape that is printed at process center.

Similar improvements can be realized at the cell level. As an example, consider an experiment in which a quadratic polynomial regression is fit to forward simulations of lithographic yield for a six-transistor SRAM fabricated with a 65 nm (nanometer)-node process. After carrying out such a regression the following compact yield model is obtained (Equation 5):

$$Y[LPD, LPUP, LPG, WPD, WPUP, WPG] = -$$
$$1.33959 LPD^2 - 0.180307 LPG - 0.0448884 LPD$$
$$LPG + 0.0792592 LPG^2 + 2.68977 LPD\ LPUP -$$
$$0.131371 LPG\ LPUP - 1.2531 LPUP^2 -$$
$$0.216857 WPD - 0.0863497 LPD\ WPD +$$

0.00702778$LPG$ $WPD$+0.079858$LPUP$ $WPD$+
0.000835561$WPD^2$−0.269024$WPG$−
0.0415822$LPD$ $WPG$−0.00213511$LPG$ $WPG$+
0.0466156$LPUP$ $WPG$−0.00731402$WPD$ $WPG$+
0.0187119$WPG^2$+0.837324$WPUP$+
0.0769995$LPD$ $WPUP$+0.000529329$LPG$
$WPUP$−0.0804688$LPUP$ $WPUP$+
0.000557718$WPD$ $WPUP$−0.0221328$WPG$
$WPUP$+0.00853561$WPUP^2$

Equation 5 uses the effective device lengths and widths (LPD, LPUP, LPG, WPD, WPUP, and WPG, where L=length, W=width, PD=pulldown, PUP=pullup, and PG=pass gate) as independent variables (input traits) for the model. The Equation 5 model should be regarded as largely illustrative since statistical techniques to prevent overfitting were not employed in the least squares regression procedure. However, Equation 5 is sufficient to illustrate a key benefit that this exemplary yield model approach provides, as will now be discussed.

Figure 5:
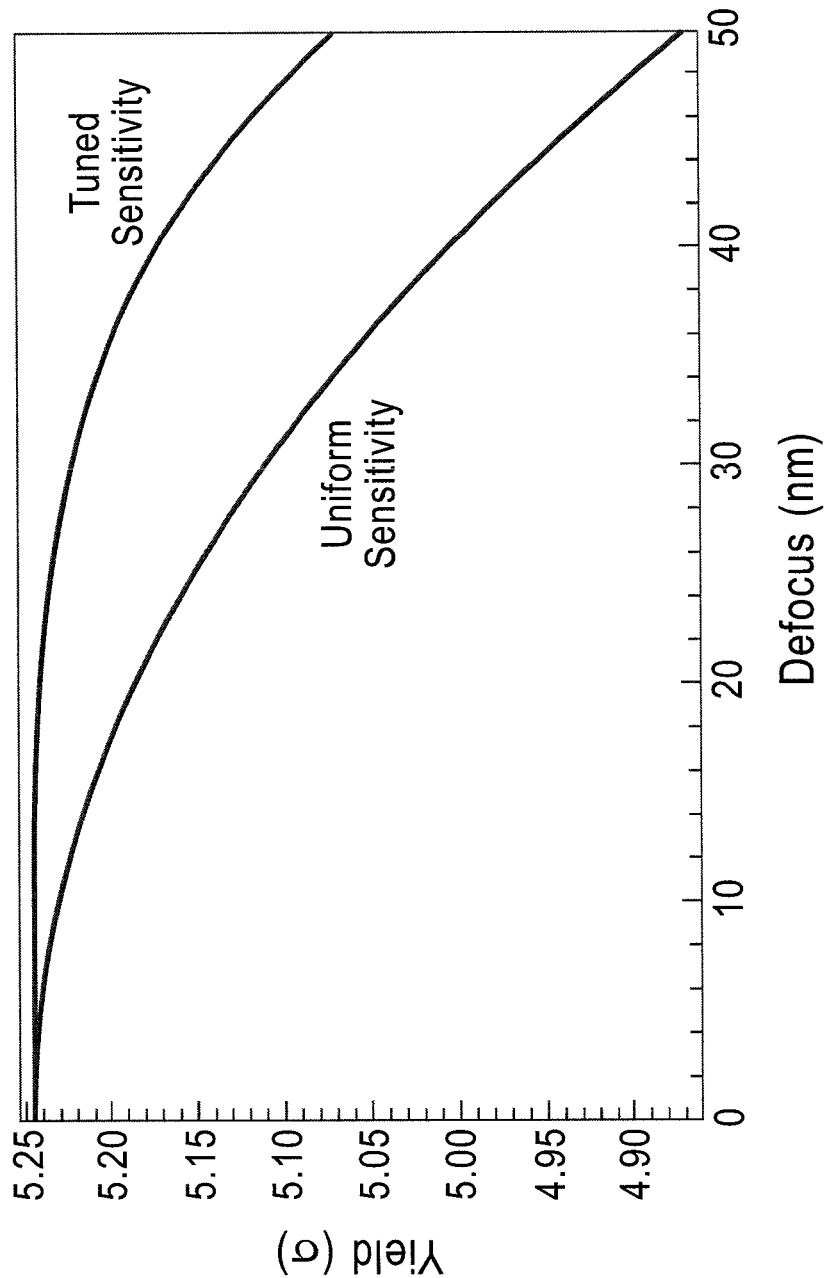
FIG. 5 is an example of array yield sensitivity and how this can be reduced by balancing process sensitivities of the different devices in an SRAM cell.

Suppose, for example, that the effective length of each device varies quadratically with defocus during the printing of PC level, with the magnitude of the variation amounting to a 4 nm increase in effective device length when the defocus is 50 nm. To represent the quadratic dependence we will define a new variable Z whose relationship to defocus z is defined as $Z \equiv z^2$. The curve entitled Uniform Sensitivity in FIG. 5 plots the resulting impact on yield according to the Equation 5 model.

If, however, an optimizer is able to adjust the lithographic mask features and process variables in such a way that the sensitivity of the pull-down effective gate length is increased by eight percent, then the Equation 5 yield model predicts the far more benign yield sensitivity shown in the curve entitled Tuned Sensitivity (assuming an unchanged focus sensitivity for the other devices). Even though edge placement (EP) errors will tend to be larger with the re-optimized process, the overall yield sensitivity is greatly reduced. The exemplary methodology achieves this because under the re-optimized conditions (Equation 6):

$$\frac{\partial Y}{\partial Z} = 0,$$

according to Equation 5. Though this example is an artificial one, the Equation 6 zero-sensitivity condition accurately describes the action of our optimizer in embodiments where the assigned depth of focus is small (so that process window is approximately minimized when the lowest order derivative is zeroed out).

In contrast, the prior edge-based litho optimization methods attempt to achieve high yield by maintaining target edge positions along the entire device perimeter as the process parameters fluctuate. For example, if the gate length is controlled by the position of two fragmentation points (denoted "a" and "b") along each edge, then considering that each of the three independent cell devices (PUP, PD, PG) has two edges (top "T" and bottom "B"), the optimizer in prior lithographic methods would attempt to maintain yield in this example by striving to control the image in multiple degrees of freedom, e.g., the optimizer would attempt to simultaneously satisfy the multiple equations:

$$\frac{\partial EP_{PUp,T,a}}{\partial Z} = 0 \quad \frac{\partial EP_{PUp,T,b}}{\partial Z} = 0$$

-continued $$\frac{\partial EP_{PUp,B,a}}{\partial Z} = 0 \quad \frac{\partial EP_{PUp,B,b}}{\partial Z} = 0$$

$$\frac{\partial EP_{PD,T,a}}{\partial Z} = 0 \quad \frac{\partial EP_{PD,T,b}}{\partial Z} = 0$$

$$\frac{\partial EP_{PD,B,a}}{\partial Z} = 0 \quad \frac{\partial EP_{PD,B,b}}{\partial Z} = 0$$

$$\frac{\partial EP_{PG,T,a}}{\partial Z} = 0 \quad \frac{\partial EP_{PG,T,b}}{\partial Z} = 0$$

$$\frac{\partial EP_{PG,B,a}}{\partial Z} = 0 \quad \frac{\partial EP_{PG,B,b}}{\partial Z} = 0$$

in the face of focus fluctuations. This approach is inherently far more difficult than that of the exemplary embodiment of the instant invention described above (which need only satisfy Equation 6 in this example), due to the limited number of degrees of freedom that are available to control the imaging process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
accessing results of forward simulations of circuit yield on a set of configurations that are drawn from at least variation ranges, the results comprising at least circuit yield results comprising simulated device shapes, the variation ranges for mask features in one or more lithographic masks used in a lithographic patterning process to create a portion of an integrated circuit comprising electrical devices that are patterned by imaging the mask features to create device shapes;
using the circuit yield results, determining high-level traits of at least the simulated device shapes;
constructing, based on the determined high-level traits and using the circuit yield results, a compact model for predicted yield, the compact model comprising a plurality of adjustable parameters, and the constructing the compact model for predicted yield comprising adjusting the adjustable parameters until at least one first predetermined criterion is met, wherein the compact model for predicted yield has a form of a truncated Taylor series and adjusting the adjustable parameters further comprises calculating coefficients of the truncated Taylor series by finite-differencing the predictions of yield from the compact model for predicted yield and the circuit yield results until finite-differences meet the at least one first criterion;
constructing an optimization problem comprising at least the compact model for yield, an objective, and a plurality of constraints; and
using the optimization problem, modifying the objective subject to the plurality of constraints until at least one second predetermined criterion is met.

2. The computer-implemented method of claim 1, further comprising outputting mask features determined in the modifying the objective operation.

3. The computer-implemented method of claim 2, further comprising creating a mask from the output mask features.

4. The computer-implemented method of claim 1, further comprising setting one of the plurality of constraints as a new objective, setting the objective as one of the plurality of constraints, and performing the constructing and modifying with the new objective.

5. A computer-implemented method comprising:
accessing results of forward simulations of circuit yield on a set of configurations that are drawn from at least variation ranges, the results comprising at least circuit yield results comprising simulated device shapes, the variation ranges for mask features in one or more lithographic masks used in a lithographic patterning process to create a portion of an integrated circuit comprising electrical devices that are patterned by imaging the mask features to create device shapes;
using the circuit yield results, determining high-level traits of at least the simulated device shapes;
constructing, based on the determined high-level traits and using the circuit yield results, a compact model for predicted yield, the compact model comprising a plurality of adjustable parameters, and the constructing the compact model for predicted yield comprising adjusting the adjustable parameters until at least one first predetermined criterion is met, wherein the at least one first predetermined criterion is setting a mean squared difference between predictions of yield from the compact model and forward simulations of circuit yield to a minimum, and wherein constructing the compact model further comprises constructing the compact model in a binary form in which predicted yield is taken to be one if a list of tolerances or ground rule requirements is met based on circuit yield results and zero otherwise, and adjusting further comprises adjusting the adjustable parameters of the binary form;

constructing an optimization problem comprising at least the compact model for yield, an objective, and a plurality of constraints; and using the optimization problem, modifying the objective subject to the plurality of constraints until at least one second predetermined criterion is met.

6. The computer-implemented method of claim 5, further comprising outputting mask features determined in the modifying the objective operation.

7. The computer-implemented method of claim 6, further comprising creating a mask from the output mask features.

8. The computer-implemented method of claim 5, further comprising setting one of the plurality of constraints as a new objective, setting the objective as one of the plurality of constraints, and performing the constructing and modifying with the new objective.

9. A computer-implemented method comprising:

accessing results of forward simulations of circuit yield on a set of configurations that are drawn from at least variation ranges, the results comprising at least circuit yield results comprising simulated device shapes, the variation ranges for mask features in one or more lithographic masks used in a lithographic patterning process to create a portion of an integrated circuit comprising electrical devices that are patterned by imaging the mask features to create device shapes;

using the circuit yield results, determining high-level traits of at least the simulated device shapes;

constructing, based on the determined high-level traits and using the circuit yield results, a compact model for predicted yield, the compact model comprising a plurality of adjustable parameters, and the constructing the compact model for predicted yield comprising adjusting the adjustable parameters until at least one first predetermined criterion is met;

constructing an optimization problem comprising at least the compact model for yield, an objective, and a plurality of constraints, wherein the objective comprises a dose window and the constraints comprise electrical yield, printability, and ground rules, and modifying the objective further comprises maximizing the dose window while maximizing the electrical yield, maintaining adequate printability and satisfying the ground rules; and using the optimization problem, modifying the objective subject to the plurality of constraints until at least one second predetermined criterion is met.

10. The computer-implemented method of claim 9, further comprising outputting mask features determined in the modifying the objective operation.

11. The computer-implemented method of claim 10, further comprising creating a mask from the output mask features.

12. The computer-implemented method of claim 9, further comprising setting one of the plurality of constraints as a new objective, setting the objective as one of the plurality of constraints, and performing the constructing and modifying with the new objective.

13. A computer-implemented method comprising:

accessing results of forward simulations of circuit yield on a set of configurations that are drawn from at least variation ranges, the results comprising at least circuit yield results comprising simulated device shapes, the variation ranges for mask features in one or more lithographic masks used in a lithographic patterning process to create a portion of an integrated circuit comprising electrical devices that are patterned by imaging the mask features to create device shapes;

using the circuit yield results, determining high-level traits of at least the simulated device shapes;

constructing, based on the determined high-level traits and using the circuit yield results, a compact model for predicted yield, the compact model comprising a plurality of adjustable parameters, and the constructing the compact model for predicted yield comprising adjusting the adjustable parameters until at least one first predetermined criterion is met;

constructing an optimization problem comprising at least the compact model for yield, an objective, and a plurality of constraints, wherein the objective comprises yield and the constraints comprise lithographic source parameters, mask feature parameters, and ground rules, and modifying the objective further comprises maximizing yield while meeting values for the lithographic source parameters and mask feature parameters and satisfying the ground rules; and using the optimization problem, modifying the objective subject to the plurality of constraints until at least one second predetermined criterion is met.

14. The computer-implemented method of claim 13, further comprising outputting mask features determined in the modifying the objective operation.

15. The computer-implemented method of claim 14, further comprising creating a mask from the output mask features.

16. The computer-implemented method of claim 13, further comprising setting one of the plurality of constraints as a new objective, setting the objective as one of the plurality of constraints, and performing the constructing and modifying with the new objective.

17. A computer-implemented method comprising:

accessing results of forward simulations of circuit yield on a set of configurations that are drawn from at least variation ranges, the results comprising at least circuit yield results comprising simulated device shapes, the variation ranges for mask features in one or more lithographic masks used in a lithographic patterning process to create a portion of an integrated circuit comprising electrical devices that are patterned by imaging the mask features to create device shapes;

using the circuit yield results, determining high-level traits of at least the simulated device shapes;

constructing, based on the determined high-level traits and using the circuit yield results, a compact model for predicted yield, the compact model comprising a plurality of adjustable parameters, and the constructing the compact model for predicted yield comprising adjusting the adjustable parameters until at least one first predetermined criterion is met;

constructing an optimization problem comprising at least the compact model for yield, an objective, and a plurality of constraints; and using the optimization problem, modifying the objective subject to the plurality of constraints until at least one second predetermined criterion is met, further comprising setting one of the plurality of constraints as a new objective, setting the objective as one of the plurality of constraints, and performing the constructing and modifying with the new objective, wherein constructing an optimization problem further comprises setting an initial set of grid points used in the modifying, and wherein the method further comprises, prior to performing the modifying with the new objective, setting up a new set of grid points and using the new set of grid points for the constructing the optimization problem and the modifying.

18. A computer-implemented method comprising:

accessing results of forward simulations of circuit yield on a set of configurations that are drawn from at least variation ranges, the results comprising at least circuit yield results comprising simulated device shapes, the variation ranges for mask features in one or more lithographic masks used in a lithographic patterning process to create a portion of an integrated circuit comprising electrical devices that are patterned by imaging the mask features to create device shapes;

using the circuit yield results, determining high-level traits of at least the simulated device shapes;

constructing, based on the determined high-level traits and using the circuit yield results, a compact model for predicted yield, the compact model comprising a plurality of adjustable parameters, and the constructing the compact model for predicted yield comprising adjusting the adjustable parameters until at least one first predetermined criterion is met;

constructing an optimization problem comprising at least the compact model for yield, an objective, and a plurality of constraints; and using the optimization problem, modifying the objective subject to the plurality of constraints until at least one second predetermined criterion is met, wherein:

modifying the objective creates mask results; and the method further comprises:

after modifying the objective, snapping the mask results to approximately rectangular shapes; and performing constructing the optimization problem, modifying the objective, and snapping the mask results until differences between a new set of shapes and a previous set of shapes meet a pre-established criterion.

\* \* \* \* \*